US012764596B2

(12) United States Patent
Rehman et al.

(10) Patent No.: US 12,764,596 B2
(45) Date of Patent: Oct. 13, 2026

(54) SYSTEMS AND METHODS FOR SEAMLESSLY PROVIDING QUALITY OF SERVICE CONTINUITY IN A WIRELESS NETWORK

(71) Applicant: Verizon Patent and Licensing Inc., Basking Ridge, NJ (US)

(72) Inventors: Syed Rehman, Monmouth Junction, NJ (US); Ravi Sharma, Freehold, NJ (US); Ambreen Habib, Golden, CO (US); Raghuram Parvataneni, Frisco, TX (US); Parry Cornell Booker, Sunnyvale, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 395 days.

(21) Appl. No.: 18/471,839

(22) Filed: Sep. 21, 2023

(65) Prior Publication Data

US 2025/0106679 A1 Mar. 27, 2025

(51) Int. Cl.
*H04W 28/02* (2009.01)
*H04W 76/10* (2018.01)

(52) U.S. Cl.
CPC ....... *H04W 28/0268* (2013.01); *H04W 76/10* (2018.02)

(58) Field of Classification Search
CPC .......................... H04W 28/0268; H04W 76/10
USPC .......................................................... 370/229
See application file for complete search history.

(56) References Cited

U.S. PATENT DOCUMENTS 10,588,052 B1 * 3/2020 Srivastava ............ H04W 76/10
2009/0154394 A1 * 6/2009 Park ...................... H04W 76/11 370/328
2009/0154422 A1 * 6/2009 Park ...................... H04W 36/26 370/331
2010/0080172 A1 * 4/2010 Jin .......................... H04W 8/08 370/328
2015/0049606 A1 * 2/2015 So ........................... H04L 47/11 370/230
2019/0215731 A1 * 7/2019 Qiao ..................... H04W 24/06
2021/0029770 A1 * 1/2021 Ying ..................... H04W 76/18
(Continued)

OTHER PUBLICATIONS

Third Generation Partnership Project, "3rd Generation Partnership Project; Technical Specification Group Core Network and Terminals; Policy and Charging Control (PCC); Reference points (Release 17)," 3GPP TS 29.212 V17.3.0 (Jun. 2023).

*Primary Examiner* — Christopher B Robinson
*Assistant Examiner* — Chong G Kim

(57) ABSTRACT

A system described herein may maintain a set of Quality of Service ("QoS") parameters associated with a particular User Equipment ("UE"). The system may provide the set of QoS parameters to a policy element of a wireless network, wherein the wireless network establishes a first dedicated bearer with the particular UE, which may be associated with the set of QoS parameters. The system may receive, after the first dedicated bearer is established, information indicating an occurrence of a particular event associated with the particular UE, and may output, to a policy element of the wireless network, a request to establish a second dedicated bearer with the particular UE. The wireless network may establish the second dedicated bearer with the particular UE, which may be associated with the set of QoS parameters.

20 Claims, 9 Drawing Sheets

(56) References Cited

U.S. PATENT DOCUMENTS

| | | | | |
|---|---|---|---|---|
| 2022/0070716 | A1* | 3/2022 | Yan | H04W 28/0925 |
| 2022/0116753 | A1* | 4/2022 | Gan | H04M 15/8228 |
| 2023/0328596 | A1* | 10/2023 | Qiao | H04W 36/0011 370/330 |
| 2024/0015612 | A1* | 1/2024 | Velev | H04W 36/0066 |
| 2024/0064623 | A1* | 2/2024 | Alasti | H04W 36/385 |
| 2025/0016870 | A1* | 1/2025 | Park | H04W 76/20 |

* cited by examiner

SYSTEMS AND METHODS FOR SEAMLESSLY PROVIDING QUALITY OF SERVICE CONTINUITY IN A WIRELESS NETWORK

BACKGROUND

Wireless networks provide wireless connectivity to User Equipment ("UEs"), such as mobile telephones, tablets, Internet of Things ("IoT") devices, Machine-to-Machine ("M2M") devices, or the like. Certain UEs and/or services provided via such wireless networks may be associated with particular Quality of Service ("QoS") parameters, Service Level Agreements ("SLAs"), or the like. For example, a voice call service may be associated with relatively low latency thresholds, high priority, etc. while a content streaming service may be associated with relatively higher latency thresholds, higher throughput thresholds, etc. As another example, different categories of UEs or users (e.g., UEs of "first responder" users, UEs of "enterprise users," etc.) may be associated with different QoS parameters, SLAs, or the like.

DETAILED DESCRIPTION OF EXAMPLE EMBODIMENTS

The following detailed description refers to the accompanying drawings. The same reference numbers in different drawings may identify the same or similar elements.

Wireless networks may provide particular QoS parameters, SLAs, etc. to UEs that are connected to such networks. For example, particular categories of users or UEs (e.g., UEs of "first responder" users, UEs of "enterprise users," mobile phones, IoT devices, etc.), particular applications or service types (e.g., voice calls, content streaming, gaming, etc.), and/or other factors may be used to determine particular QoS parameters or SLAs to apply to traffic associated with respective UEs via a given network. Networks may implement such QoS parameters, SLAs, etc. via communication sessions such as IP sessions, dedicated bearers, etc. that are associated with differentiated QoS parameters, SLAs, etc.

For example, a wireless network may include one or more IP gateways, such as one or more Packet Data Network ("PDN") Gateways ("PGWs"), Evolved Packet Data Gateways ("ePDGs"), User Plane Functions ("UPFs"), etc. that serve as endpoints for communication sessions (e.g., IP sessions, dedicated bearers, etc.) between UEs and the network. Establishing such a communication session between the wireless network and a particular UE may include assigning an IP address or other suitable identifier that is associated with the particular UE and the communication session.

Situations may arise in which a UE, which is associated with such a communication session with an IP gateway of the wireless network, is assigned to another IP gateway of the wireless network. For example, different IP gateways of the wireless network may be associated with different geographical regions, and the UE may travel from a geographical region associated with one IP gateway to a geographical region associated with another IP gateway. As another example, the UE may be assigned to a different IP gateway due to overloading, reconfiguration, or hardware failure of an IP gateway with which the UE is communicating. In such situations, the IP address of the UE may be changed, as different IP gateways may be associated with different IP address pools, subnets, or the like. The changing of the IP address of the UE may potentially lead to difficulties or inefficiencies in maintaining the QoS parameters, associated with the communication session with the initial IP gateway, for the communication session associated with the new IP gateway. Embodiments described herein provide a mechanism for seamless continuity of the QoS parameters associated with communication sessions between UEs and a wireless network in situations where the UE transitions between different IP gateways of the wireless network.

Figure 1:
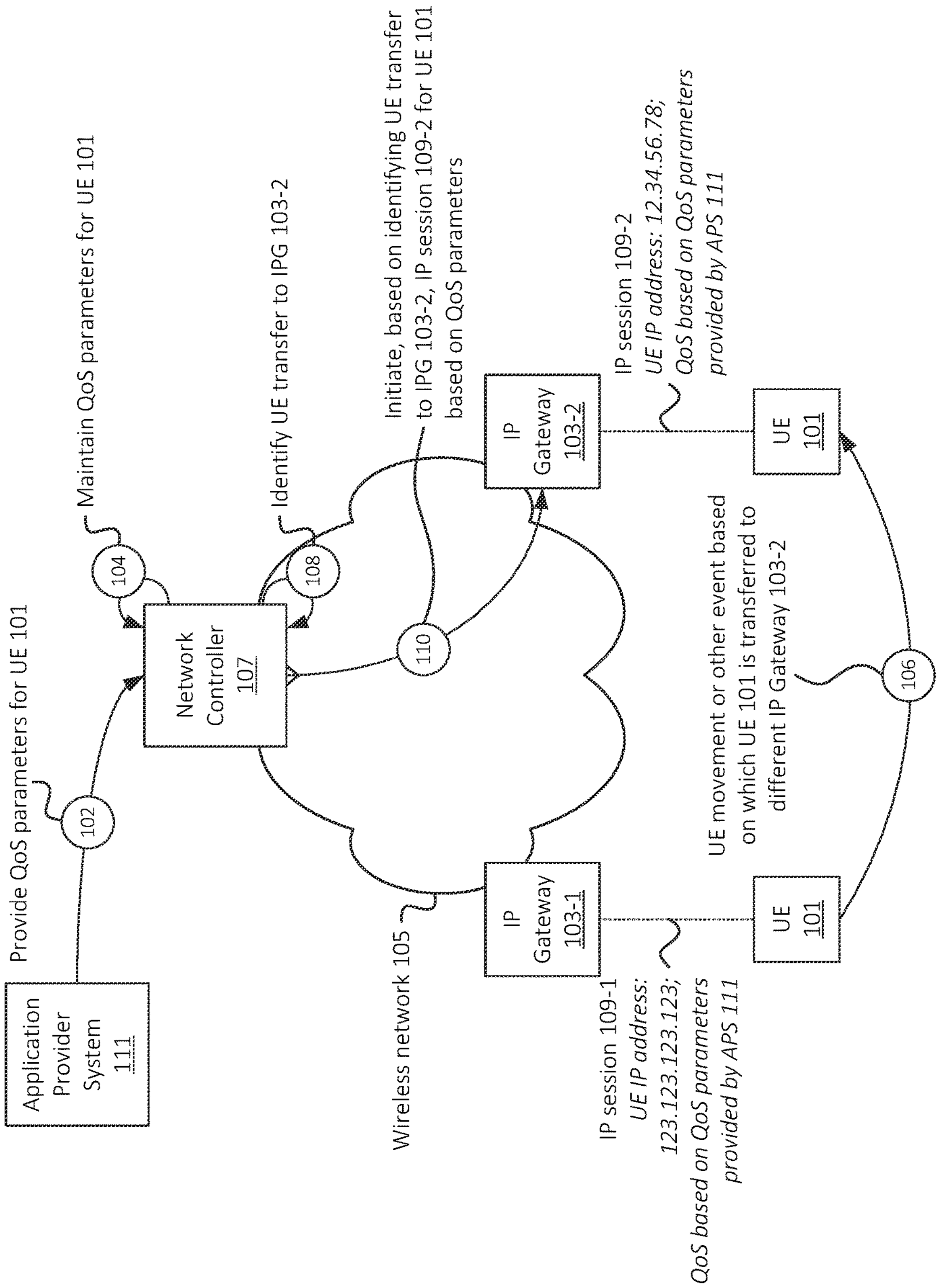
FIG. 1 illustrates an example overview of one or more embodiments described herein.

As shown in FIG. 1, for example, UE 101 may communicate with a particular IP gateway 103-1 of wireless network 105. Wireless network 105 may be, or may include, for example, a Long-Term Evolution ("LTE") network, a Fifth Generation ("5G") network, or some other type of network. As shown, wireless network 105 may include multiple IP gateways 103 (e.g., IP gateway 103-1, IP gateway 103-2, and/or one or more other IP gateways 103). As noted above, IP gateways 103 may be, may include, may implement, or may be implemented by one or more PGWs, ePDGs, UPFs, or the like. UE 101 may have been assigned, such as by network controller 107 associated with wireless network 105, to communicate with IP gateway 103-1 based on a location of UE 101 (e.g., where such location is associated with IP gateway 103-1) and/or based on other suitable factors. The communications between UE 101 and IP gateway 103-1 may include, for example, a particular IP session 109-1 (e.g., a dedicated bearer) that is associated with a particular set of QoS parameters, such as latency thresholds, throughput thresholds, or other suitable parameters. In this example, IP session 109-1 may be associated with a particular IP address for UE 101, such as the example IP address 123.123.123.123. For example, IP gateway 103-1 and/or one or more other devices may send traffic to UE 101 (e.g., via IP session 109-1 and/or one or more other sessions) using the IP address 123.123.123.123.

In some embodiments, the QoS parameters for IP session 109-1 may have been provided (at 102) by application provider system 111, which may be associated with one or more applications, services, etc. provided to UE 101 via IP gateway 103-1 (e.g., via IP session 109-1). In accordance with some embodiments, network controller 107 may maintain (at 104) the QoS parameters associated with UE 101 and/or the one or more applications, services, etc. indicated (e.g., by application provider system 111) as being associated with such QoS parameters.

As further shown, UE 101 may be transferred, reassigned, etc. from IP gateway 103-1 to IP gateway 103-2. For example, UE 101 may move from a geographical location, service region, etc. associated with IP gateway 103-1 to a geographical location, service region, etc. with which IP gateway 103-2 is associated. As discussed above, UE 101 may be reassigned (at 106) to IP gateway 103-2 based on one or more other suitable factors. In the course of the reassignment to IP gateway 103-2, UE 101 may be assigned with a different IP address (e.g., 12.34.56.78).

In accordance with some embodiments, and as further described below, network controller 107 may identify (at 108) the transfer of UE 101 from IP gateway 103-1 to IP gateway 103-2. For example, network controller 107 may receive an indication of UE movement and/or some other suitable indication based on which network controller 107 may determine that the IP address of UE 101 has changed and/or that UE 101 has been reassigned to IP gateway 103-2. Based on receiving such indication, network controller 107 may initiate (at 110) the establishment of IP session 109-2 in accordance with the QoS parameters previously associated with IP session 109-1 (e.g., as provided (at 102) by application provider system 111 and as maintained (at 104) by network controller 107). In this manner, UE 101 may receive continuous, uninterrupted service according to the QoS parameters in mobility scenarios or other scenarios in which UE 101 is transferred from one IP gateway 103 to another. Further, since network controller 107 initiates (e.g., at 110) the establishment of IP session 109-2 in accordance with the QoS parameters based on identifying (at 108) the transfer of UE 101 to IP gateway 103-2, the establishment of IP session 109-2 may be performed faster or sooner than implementations in which IP gateway 103-2 requests or otherwise determines QoS information for UE 101 in response to, or after, UE 101 communicates with IP gateway 103-2.

Figure 2:
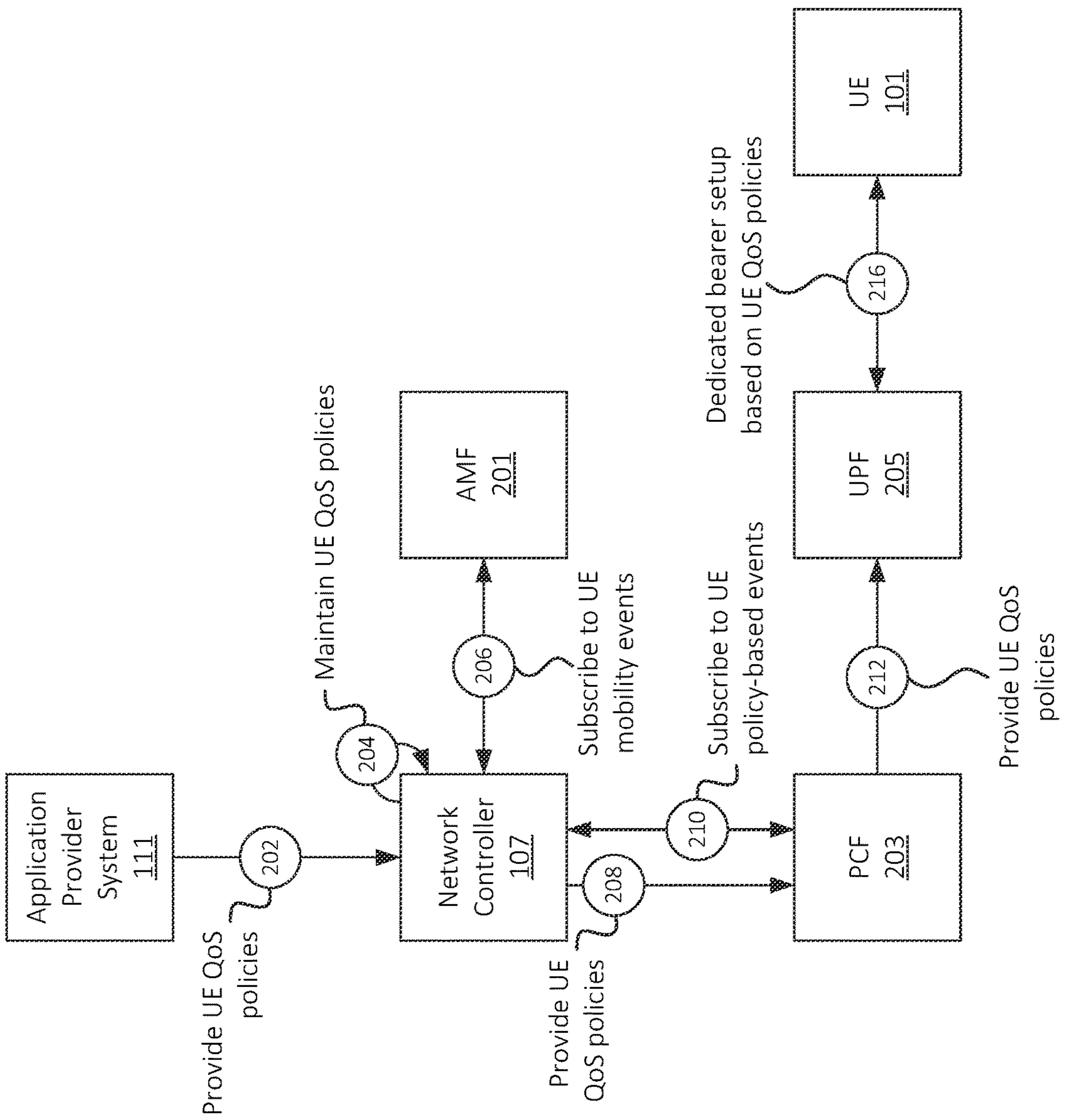
FIGS. 2 and 3 illustrate example operations in which QoS parameters may be seamlessly implemented when a UE is transferred between different Internet Protocol ("IP") gateways of a wireless network, in accordance with some embodiments.
Figure 3:
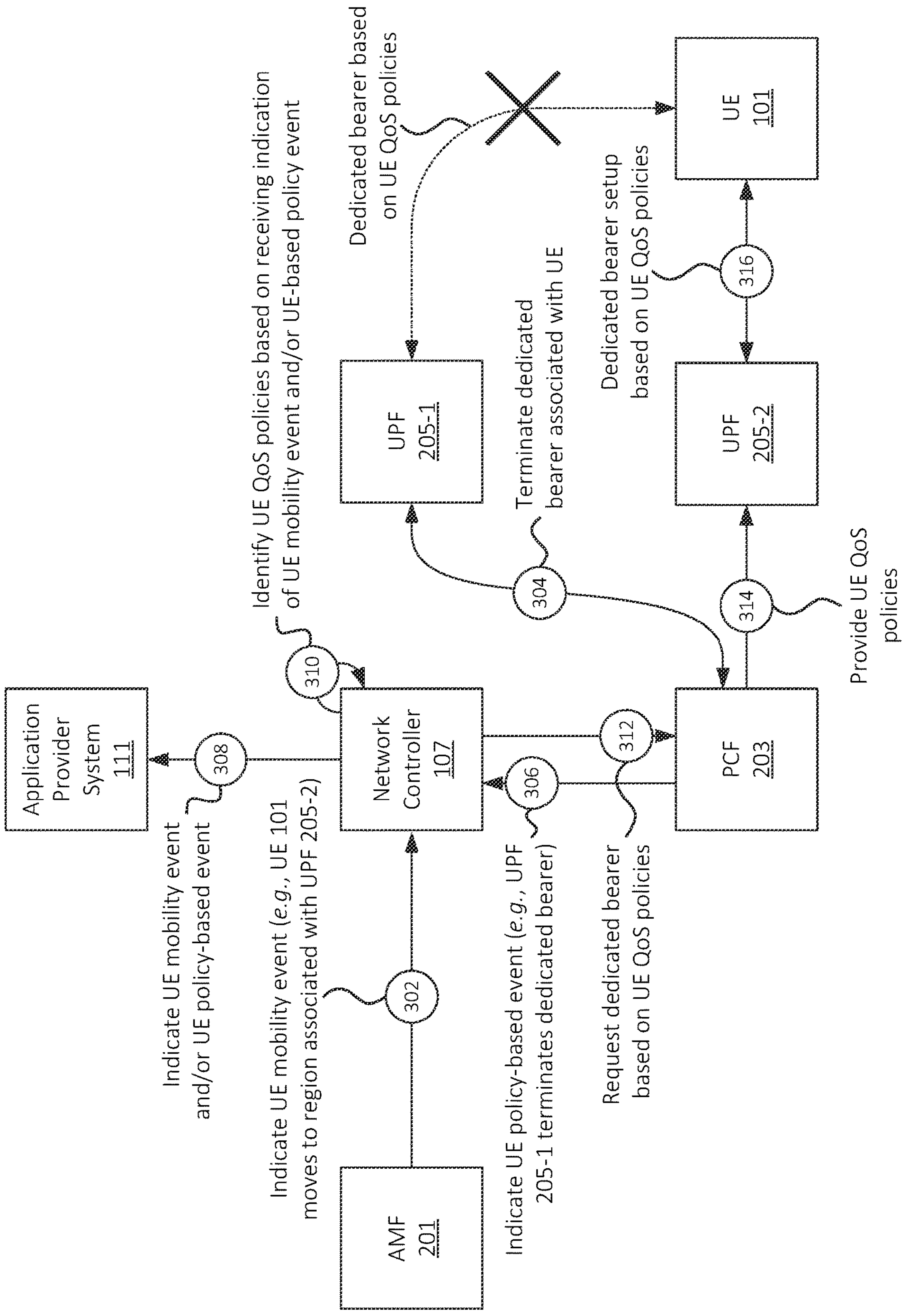

FIGS. 2 and 3 illustrate further details of some or all of the operations shown in FIG. 1. As shown in FIG. 2, application provider system 111 may provide (at 202) UE QoS policies, which may include latency thresholds, throughput thresholds, SLAs, or other suitable QoS parameters. The QoS policies may include an identifier or indicator of one or more particular applications, services, etc. with which application provider system 111 is associated. Network controller 107 may, for example, authenticate and/or otherwise determine whether application provider system 111 is authorized to provide the QoS parameters for such applications, services, etc. Additionally, or alternatively, the UE QoS policies may include one or more identifiers of one or more UEs, types of UEs, users, user groups, etc. with which particular QoS policies are associated. As noted above, network controller 107 may maintain (at 204) the UE QoS policies in order to facilitate the seamless transfer of UEs, subject to such QoS policies, in situations where such UEs are transferred to different IP gateways 103 or are otherwise reassigned with different endpoint identifiers (e.g., different IP addresses).

Application provider system 111 may provide (at 202) the UE QOS policies when a given UE (e.g., UE 101) begins receiving a service associated with one or more applications provided by application provider system 111 (e.g., via web server, via a Multi-Access/Mobile Edge Computing ("MEC") device, referred to sometimes herein simply as a "MEC," and/or via some other device or system). In some embodiments, application provider system 111 may provide the UE QoS policies at some other time, which may not necessarily be dependent on a given UE requesting or receiving services from an application associated with application provider system 111.

Network controller 107 may, based on receiving the UE QoS policies, subscribe (at 206) to mobility events associated with the UE QoS policies. For example, network controller 107 may communicate with a mobility management entity associated with wireless network 105, such as Access and Mobility Management Function ("AMF") 201, to indicate that network controller 107 should be notified when mobility events occur with respect to UEs that are subject to the UE policies. For example, network controller 107 may provide identifiers of such UEs (e.g., International Mobile Station Equipment Identity ("IMEI") values, International Mobile Subscriber Identity ("IMSI") values, Mobile Directory Numbers ("MDNs"), Subscription Permanent Identifier ("SUPI") values, Globally Unique Temporary Identifier ("GUTI") values, or other suitable identifiers) associated with such UEs. Additionally, or alternatively, network controller 107 may provide other types of criteria or characteristics, such as device types (e.g., mobile phones, IoT devices, autonomous or semi-autonomous vehicles, etc.), user groups (e.g., "enterprise" users, "first responder" users, etc.), based on which AMF 201 may determine UEs for which mobility events should be indicated to network controller 107.

In some embodiments, network controller 107 may communicate with AMF 201 via a Network Exposure Function ("NEF") of wireless network 105. For example, in some embodiments, network controller 107 may be a device or system that is external to the architecture of wireless network 105, and may communicate with one or more elements of wireless network 105, such as AMF 201, via the NEF. In some embodiments, network controller 107 may be, or may be implemented by, a device or system that is internal to the architecture of wireless network 105, and/or network controller 107 may communicate with elements of wireless network 105 via some other suitable communication pathway. In some embodiments, AMF 201 may be associated with a Service-Based Interface ("SBI") of a Service-Based Architecture, such as an Namf interface, via which the NEF, network controller 107, and/or one or more other devices or systems may communicate with AMF 201.

In some embodiments, network controller 107 may indicate types of mobility events or other suitable criteria of mobility events for which network controller 107 should be notified. For example, network controller 107 may indicate that network controller 107 should be notified when particular UEs move from one tracking area ("TA") to another, when UEs move from a region associated with one IP gateway 103 to a region associated with another IP gateway 103, or the like. For example, network controller 107 may not need to be notified about certain types of mobility events, such as situations in which a given UE moves from within a region associated with an IP gateway 103 to another region associated with the same IP gateway 103.

Network controller 107 may provide (at 208) some or all of the received UE QoS policies to a policy element of wireless network 105, such as Policy Control Function ("PCF") 203. Network controller 107 may also subscribe (at 210) to policy-based events associated with one or more UEs subject to the UE QoS policies. Network controller 107 may communicate (at 208 and/or 210) with PCF 203 via a NEF, an SBI associated with PCF 203 (e.g., an Npcf interface), and/or some other suitable communication pathway. The policy-based events may include triggers, events, etc. such as when PCF 203 initiates the termination of one or more IP sessions 109 associated with a given UE, and/or other suitable policy-based events for which PCF 203 is capable of outputting notifications.

PCF 203 may provide (at 212) the UE QoS policies to an IP gateway 103 of wireless network 105, such as UPF 205. In some embodiments, PCF 203 may output the UE QoS policies using Diameter protocol messaging or some other suitable protocol. In some embodiments, the UE QoS policies may be included with a request (e.g., a re-authorization request ("RAR") message) or instruction to create or otherwise use a dedicated bearer for communications between UPF 205 and a particular UE indicated in the UE QoS policies, such as UE 101. The request or instruction may further include an indication to implement the QoS policies (e.g., meet latency thresholds, throughput thresholds, and/or other thresholds or SLAs). In other words, the requested dedicated bearer may be associated with the UE QoS policies provided by PCF 203.

In some embodiments, PCF 203 may directly provide (at 212) the UE QoS policies to UPF 205 (e.g., via an SBI associated with UPF 205, such as an Nupf SBI). In some embodiments, PCF 203 may provide the UE QoS policies to another device or system (e.g., a Policy Control Enforcement Function ("PCEF") or some other element of wireless network 105), which may forward the UE QoS policies to UPF 205.

UPF 205 and/or one or more other elements of wireless network 105 may proceed to establish or set up (at 216) a dedicated bearer between UPF 205 and UE 101, where such dedicated bearer is associated with the UE QOS policies. While the setup procedure (at 216) is shown in the figure as including communications between UPF 205 and UE 101, one or more other devices or systems of wireless network 105 (e.g., a Session Management Function ("SMF")) may participate in the dedicated bearer setup procedure. In this manner, UE 101 and UPF 205 may communicate via the dedicated bearer, and UE 101 may receive one or more services via UPF 205 in accordance with the UE QOS policies (e.g., latency thresholds for the one or more services, throughput thresholds for the one or more services, or the like).

As shown in FIG. 3, network controller 107 may receive (at 302) a notification of a UE mobility event. Assume, for example, that UE 101 is initially in communication with a first UPF 205-1 via a dedicated bearer associated with UE QoS policies associated with UE 101. Such dedicated bearer may have been established in accordance with the example operations shown in FIG. 2 and/or in some other manner. AMF 201 may determine that UE 101 has moved from a first geographical location associated with UPF 205-1 to a second geographical location associated with a second UPF 205-2, and may indicate (at 302) to network controller 107 that such mobility event has occurred. In some embodiments, AMF 201 may provide an identifier of UPF 205-2, an indication of a location of UE 101, and/or other suitable information to network controller 107.

Further, in some embodiments, UPF 205-1 may request (at 304) the termination of the dedicated bearer between UPF 205-1 and UE 101. For example, UPF 205-1 may determine that no traffic has been sent or received via the dedicated bearer for a threshold period of time, and/or may otherwise determine that the dedicated bearer is not being used or should be terminated. As such, UPF 205-1 may output (at 304) a request to PCF 203 and/or some other device or system to terminate the dedicated bearer. As similarly noted above, UPF 205-1 may output the request to an SMF or other element of wireless network 105, which may forward the dedicated bearer termination request to PCF 203. PCF 203 may respond to UPF 205-1, the SMF, etc. with a confirmation of the termination of the dedicated bearer between UPF 205-1 and UE 101.

PCF 203 may further indicate (at 306) a UE policy-based event to network controller 107. including an indication that the dedicated bearer between UPF 205-1 and UE 101 was terminated. For example, as discussed above, PCF 203 may output such information to network controller 107 based on a subscription by network controller 107 to policy-based events associated with UE 101.

Network controller 107 may output (at 308) one or more indications of the events of which network controller 107 has been notified. For example, network controller 107 may output such indications to application provider system 111 based on receiving (at 302) the indication of the UE mobility event and/or based on receiving (at 306) the indication of the UE policy-based event. Although shown in FIG. 3 as one communication, network controller 107 may output (at 308) multiple different indications to application provider system 111 at different times. For example, the UE mobility event may be determined (e.g., by AMF 201) some time before the UE policy-based event is determined (e.g., by PCF 203). In such scenarios, network controller 107 may first output the indication of the UE mobility event, and may subsequently output the indication of the UE policy-based event. In some embodiments, network controller 107 may provide an indication of one type of event, without providing the indication of the other type of event (e.g., may provide an indication of the UE mobility event but not the UE policy-based event).

Further, based on receiving the indication of the UE mobility event and/or the UE-based policy event, network controller 107 may identify (at 310) the set of UE QoS policies associated with UE 101. Network controller 107 may further request (at 312) the establishment of a dedicated bearer between UPF 205-2, with which UE 101 is currently associated, and UE 101. In some embodiments, the request (at 312) may include an identifier of UPF 205-2 and/or UE 101 or other indication based on which PCF 203 may identify that the requested dedicated bearer should be established between UPF 205-2 and UE 101. The request may further include or otherwise identify the UE QoS policies associated with UE 101 (e.g., which should be implemented by way of the requested dedicated bearer). As noted above, network controller 107 may issue the request to a NEF or some other suitable device or system, which may forward the request to PCF 203 (e.g., after verifying that network controller 107 is authorized to make such request).

PCF 203 may further provide (at 314) the UE QOS policies, indicated in the request (at 312), to UPF 205-2. As similarly noted above, for example, PCF 203 may provide such information via one or more RAR messages, one or more Diameter protocol messages, etc. UPF 205-2 and/or one or more other devices or systems (e.g., an SMF) may accordingly establish (at 316) a dedicated bearer between UPF 205-2 and UE 101, using QoS parameters indicated in the UE QoS policies. Such QoS parameters may be the same as QoS parameters used for the previous dedicated bearer between UE 101 and UPF 205-1.

In this manner, UE 101 may continue receiving services via the new dedicated bearer, with the same QoS parameters as were received via the previous dedicated bearer between UE 101 and UPF 205-1. As further discussed above, since the dedicated bearer setup procedure may be initiated based on events such as a UE mobility event, the dedicated bearer setup procedure may be performed sooner, more quickly, etc. than implementations in which other triggers or procedures (e.g., requests from UPF 205-2) are used to identify QoS parameters to use for communications between UPF 205-2 and UE 101.

Figure 4:
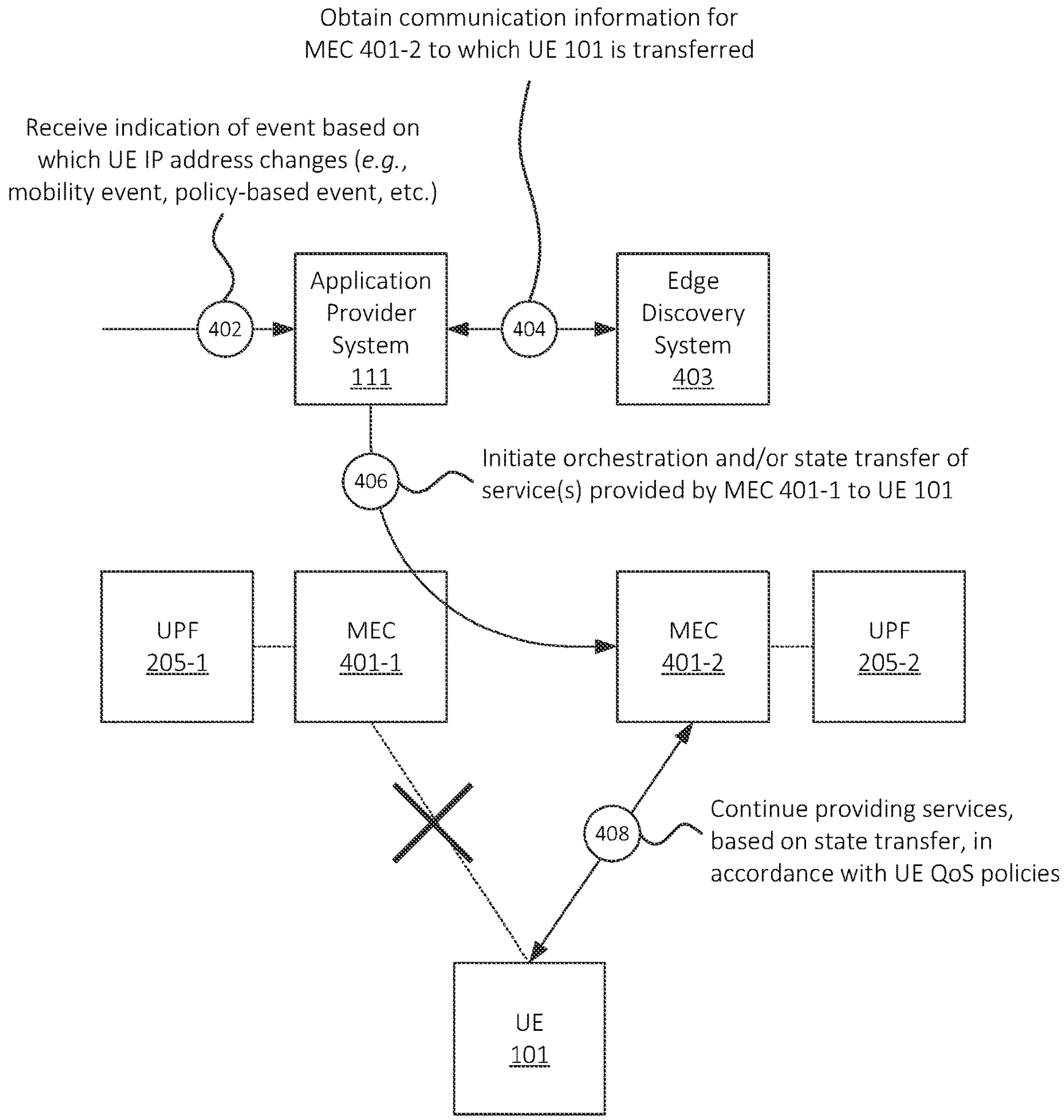
FIG. 4 illustrates an example of a seamless state transfer that may be performed, in accordance with some embodiments.

In some embodiments, as shown in FIG. 4, the event notifications received by application provider system 111 (e.g., from AMF 201, PCF 203, and/or other device or system of wireless network 105) may be used for service continuity in situations where a service, received by UE 101 via wireless network 105, is provided by one or more MECs 401 of wireless network 105. For example, such service may be a stateful service, such as a gaming service (e.g., in which a state may refer to a user's current score or position in a game world), a content streaming service (e.g., in which a state may refer to a temporal position in media content such as a movie or song being streamed to UE 101), and/or other types of stateful services.

As shown, application provider system 111 may receive (at 402) an indication of an event based on which an IP address of UE 101 has changed. As discussed above, application provider system 111 may receive such indication from network controller 107 (e.g., based on a subscription by network controller 107 to network information indicating such events) and/or some other suitable source. As also discussed above, such events may include a mobility event, a policy-based event, etc. For example, UE 101 may have previously received services associated with an application installed at a first MEC 401-1, which may be communicatively coupled to or otherwise associated with UPF 205-1. For example, MEC 401-1 and UPF 205-1 may be implemented by the same set of hardware resources, or may otherwise be associated. UPF 205-1 may, for example, route or forward traffic sent by one or more applications installed at MEC 401-1 to UE 101, and may route or forward traffic sent by UE 101 to one or more applications installed at MEC 401-1. As discussed above, UE 101 and UPF 205-1 may be associated with one or more dedicated bearers that are associated with particular QoS parameters (e.g., based on one or more UE QoS policies, as discussed above).

As further shown, UE 101 may be reassigned to UPF 205-2 based on a movement of UE 101 to a geographical region associated with UPF 205-2 and/or based on some other suitable factors or events. Further assume that UPF 205-2 is associated with MEC 401-2. For example, UPF 205-2 and MEC 401-2 may be implemented by the same set of hardware resources, may be communicatively coupled to each other, or may otherwise be associated with each other. As similarly noted above, when UE 101 is reassigned to UPF 205-2, UE 101 may be associated with a different IP address than was assigned for UE 101 when UE 101 was assigned to UPF 205-1.

Based on receiving (at 402) the indication that UE 101 has been assigned to UPF 205-2, and/or otherwise that the IP address of UE 101 has changed, application provider system 111 may identify MEC 401-2, with which UPF 205-2 is associated. For example, application provider system 111 may query (at 404) edge discovery system 403, which may identify or determine a particular serving MEC 401 based on factors such as UE location, application SLAs or QoS parameters, or other factors. In this example, edge discovery system 403 may indicate (at 404) to application provider system 111 that MEC 401-2 is an optimal MEC via which services may be provided to UE 101 (e.g., the optimal MEC may have changed from MEC 401-1 to MEC 401-2 based on factors such as movement of UE 101, an association between UPF 205-2 and MEC 401-2, and/or other suitable factors). In some embodiments, edge discovery system 403 may provide communication information for MEC 401-2, such as an IP address, a MEC identifier, or other suitable information based on which MEC 401-2 may be identified.

Application provider system 111 may initiate (at 406) a state transfer of one or more services, provided by MEC 401-1, to MEC 401-2 in order to facilitate a seamless service transition for UE 101. For example, application provider system 111 may instruct MEC 401-1 to provide up-to-date state information to MEC 401-2, and/or may otherwise effectuate a state transfer such that MEC 401-2 receives up-to-date state information for the services previously provided to UE 101 by MEC 401-1. In this manner, MEC 401-2 may continue providing (at 408) services previously provided by MEC 401-1. Further, since UPF 205-2, via which MEC 401-2 communicates with UE 101, has received UE QoS policies associated with UE 101 (e.g., as discussed above, in accordance with some embodiments), the communications between UE 101 and MEC 401-2 may be provided in accordance with such UE QoS policies. As such, both the QoS parameters of the services as well as the state of the services may be preserved when UE 101 transitions to receiving the services from MEC 401-2 via UPF 205-2.

Embodiments described above are provided in the context of certain operations being performed by AMF 201, PCF 203, UPF 205, application provider system 111, and a NEF. In practice, similar operations may be performed by one or more other devices or systems. For example, operations described above with respect to AMF 201 may be performed by a Mobility Management Entity ("MME") or some other type of access and/or mobility management element of wireless network 105. In some embodiments, operations described above with respect to PCF 203 may be performed by a Policy Charging and Rules Function ("PCRF") and/or some other policy management and/or enforcement element of wireless network 105. In some embodiments, operations described above with respect to UPF 205 may be performed by a PGW, an ePDG, or some other gateway (e.g., another type of IP gateway 103) of wireless network 105. In some embodiments, operations described above with respect to a NEF of wireless network 105 may be performed by a Service Capability Exposure Function ("SCEF") of wireless network 105 and/or some other device or system that serves as an interface between elements of wireless network 105 and devices or systems that are external to wireless network 105. In some embodiments, one or more devices or systems, in addition to or in lieu of application provider system 111, may perform some or all of the operations described above with respect to application provider system 111. In some embodiments, as discussed below, one or more devices or systems may perform the functionality of multiple network elements, such as a PCF/PCRF that performs functionality of PCF 203 and a PCRF, a UPF/PGW that performs functionality of UPF 205 and a PGW, etc.

Figure 5:
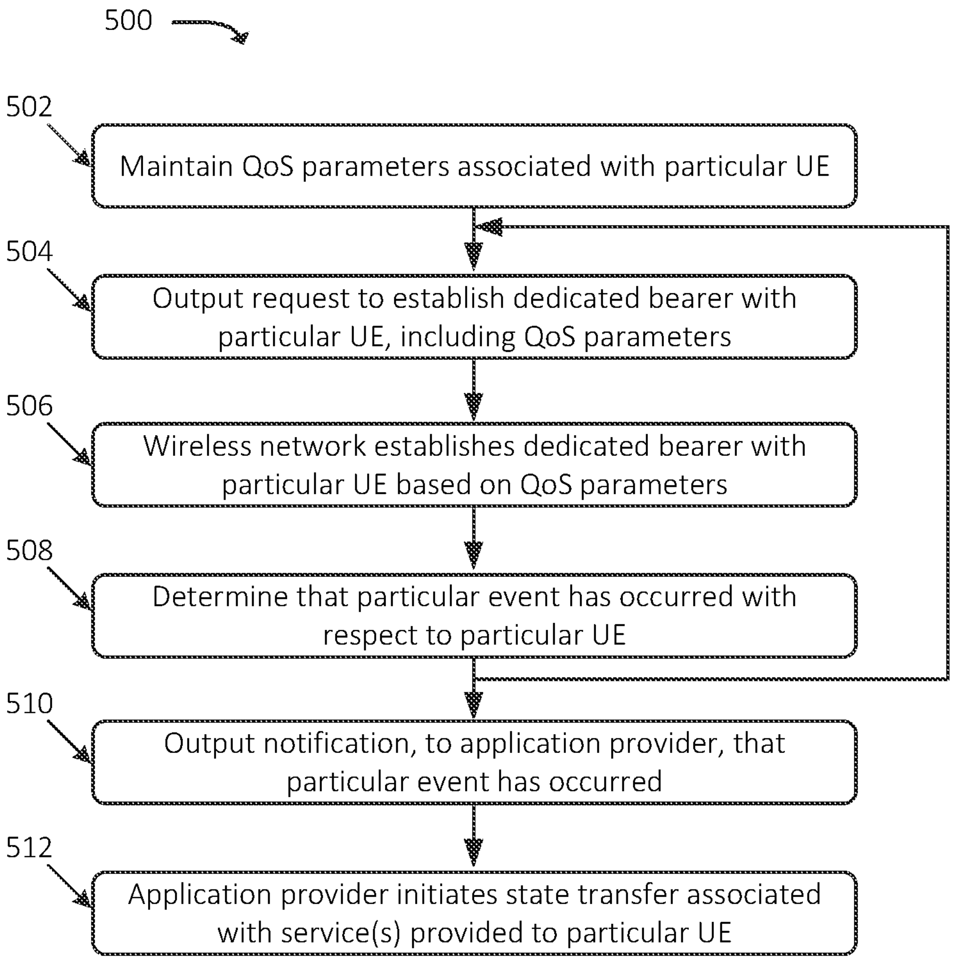
FIG. 5 illustrates an example process for providing seamless QoS parameters and/or state transfer for a UE that is transferred between different IP gateways and/or edge computing devices, in accordance with some embodiments.

FIG. 5 illustrates an example process 500 for providing a seamless transition (e.g., of QoS parameters and/or of service state) when UE 101 is transferred from one IP gateway 103 of wireless network 105 to another. In some embodiments, some or all of process 500 may be performed by network controller 107. In some embodiments, one or more other devices may perform some or all of process 500 in concert with, and/or in lieu of, network controller 107 (e.g., a policy element of wireless network 105 such as PCF 203 or a PCRF and/or one or more other devices or systems).

As shown, process 500 may include maintaining (at 502) QoS parameters associated with a particular UE 101. For example, as discussed above, network controller 107 may receive such QoS parameters from a given application provider system 111, which provides or is otherwise associated with an application or service received by UE 101 (e.g., via wireless network 105) and/or from some other suitable source. In some embodiments, network controller 107 may receive the QoS parameters when application provider system 111 determines that UE 101 has requested a service associated with application provider system 111, has begun receiving a service associated with application provider system 111, and/or at some other time or based on some other criteria.

Process 500 may further include outputting (at 504) a request to establish a dedicated bearer with the particular UE 101. The request may include the QoS parameters, and may be provided to one or more elements of wireless network 105. Additionally, or alternatively, network controller 107 may output the QoS parameters without explicitly requesting the establishment of a dedicated bearer. As discussed above, network controller 107 may provide the request and/or the QoS parameters to a NEF, SCEF, or other suitable element of wireless network 105. In some embodiments, the NEF, SCEF, etc. may forward the request and/or the QoS parameters to a policy element of wireless network 105, such as PCF 203, a PCRF, or the like.

Process 500 may additionally include establishing (at 506), by wireless network 105, the dedicated bearer with the particular UE 101 based on the QoS parameters. For example, the policy element of wireless network 105 (e.g., PCF 203, a PCRF, etc.) may use Diameter protocol messaging, an RAR message, and/or some other suitable protocol or message to initiate the establishment of a dedicated bearer, where such dedicated bearer implements or is otherwise associated with the QoS parameters associated with the particular UE 101. In some embodiments, establishing the dedicated bearer may include communicating with a particular IP gateway 103 of wireless network 105, such as UPF 205, a PGW, etc. Additionally, or alternatively, establishing the dedicated bearer may include communicating with a session management element of wireless network 105, such as a Session Management Function ("SMF"), a Serving Gateway ("SGW"), or the like. As discussed above, the dedicated bearer may implement and/or may otherwise be associated with the provided QoS parameters. The particular IP gateway 103 (e.g., UPF 205, a PGW, etc.) and UE 101 may be endpoints (e.g., IP endpoints) of the dedicated bearer. In this manner, the dedicated bearer may be considered as being a communication session between IP gateway 103 and UE 101. UE 101 may have been assigned an IP address or other suitable type of identifier (e.g., by one or more elements of wireless network 105, based on an attachment or registration of UE 101 with wireless network 105), which may be used to denote that UE 101 is an endpoint of the communication session.

Process 500 may also include determining (at 508) that a particular event has occurred with respect to the particular UE 101. For example, as discussed above, network controller 107 may have subscribed to mobility events associated with UE 101. Subscribing to mobility events may include, in some embodiments, indicating to an access and/or mobility element of wireless network 105, such as AMF 201, an MME, etc., that network controller 107 should be notified when a mobility event occurs with respect to UE 101. As discussed above, such mobility events may include a movement of UE 101 from a first geographical region associated with a first IP gateway 103 (e.g., UPF 205, a PGW, etc.) to a second geographical region associated with a second IP gateway 103.

As another example, network controller 107 may have subscribed to policy-based events associated with UE 101, such as events in which UE 101 is transferred from a first IP gateway 103 to a second IP gateway 103 based on one or more policies or other operations by a policy element of wireless network 105, such as PCF 203, a PCRF, etc. In some embodiments, network controller 107 may have subscribed to one or more other types of events which may be indicative of a transfer of UE 101 from one IP gateway 103 to another, and/or of a change (e.g., reassignment) of an IP address or other type of identifier of UE 101.

Based on determining (at 508) that the particular event has occurred, network controller 107 may repeat one or more of the operations described above, in order to provide QoS continuity of services received by UE 101 via the dedicated bearer. For example, network controller 107 may output (at 504) a request to establish a dedicated bearer (e.g., a second dedicated bearer) with the particular UE 101, and/or may provide the QoS parameters associated with UE 101 to wireless network 105 (e.g., to a policy element of wireless network 105, such as PCF 203, a PCRF, etc.). In some embodiments, this request may include an IP address of UE 101 (e.g., a different IP address than was previously assigned to UE 101), an identifier of a particular IP gateway 103 to which UE 101 has been reassigned, and/or other suitable information. Wireless network 105 may establish (at 506) the second dedicated bearer between the particular IP gateway 103 and UE 101, which may include the updated or reassigned IP address of UE 101 as an endpoint. Further, the second dedicated bearer may include the same QoS parameters as were used by the previously established dedicated bearer, thus providing continuity of the QoS parameters previously received by UE 101 via the previous dedicated bearer.

Further, based on determining (at 508) that the particular event has occurred with respect to UE 101. process 500 may further include outputting (at 510) a notification, to application provider system 111, that the particular event has occurred. As discussed above, notifying application provider system 111 based on determining (at 508) the occurrence of the event may provide application provider system 111 more timely notice that the event has occurred, based on which application provider system 111 may perform one or more operations to facilitate the smooth continuity of services, associated with application provider system 111, provided to UE 101. For example, application provider system 111 may identify (at 512) a particular edge computing device, such as a given MEC 401, that UE 101 should communicate with based on the occurrence of the event. For example, the event may include a mobility event in which a particular MEC 401-1, that was previously serving UE 101, is no longer an optimal MEC. For example, UE 101 may have moved to a location that is more optimally served by a different MEC 401-2 (e.g., MEC 401-2 may be able to provide lower latency services to UE 101 in the location to which UE 101 has moved). Application provider system 111 may perform operations such as initiating a state transfer of a service previously provided by MEC 401-1, such that MEC 401-2 is made up-to-date with respect to a state of the service and is able to continue providing the service without interrupting or losing the state of the service.

Figure 6:
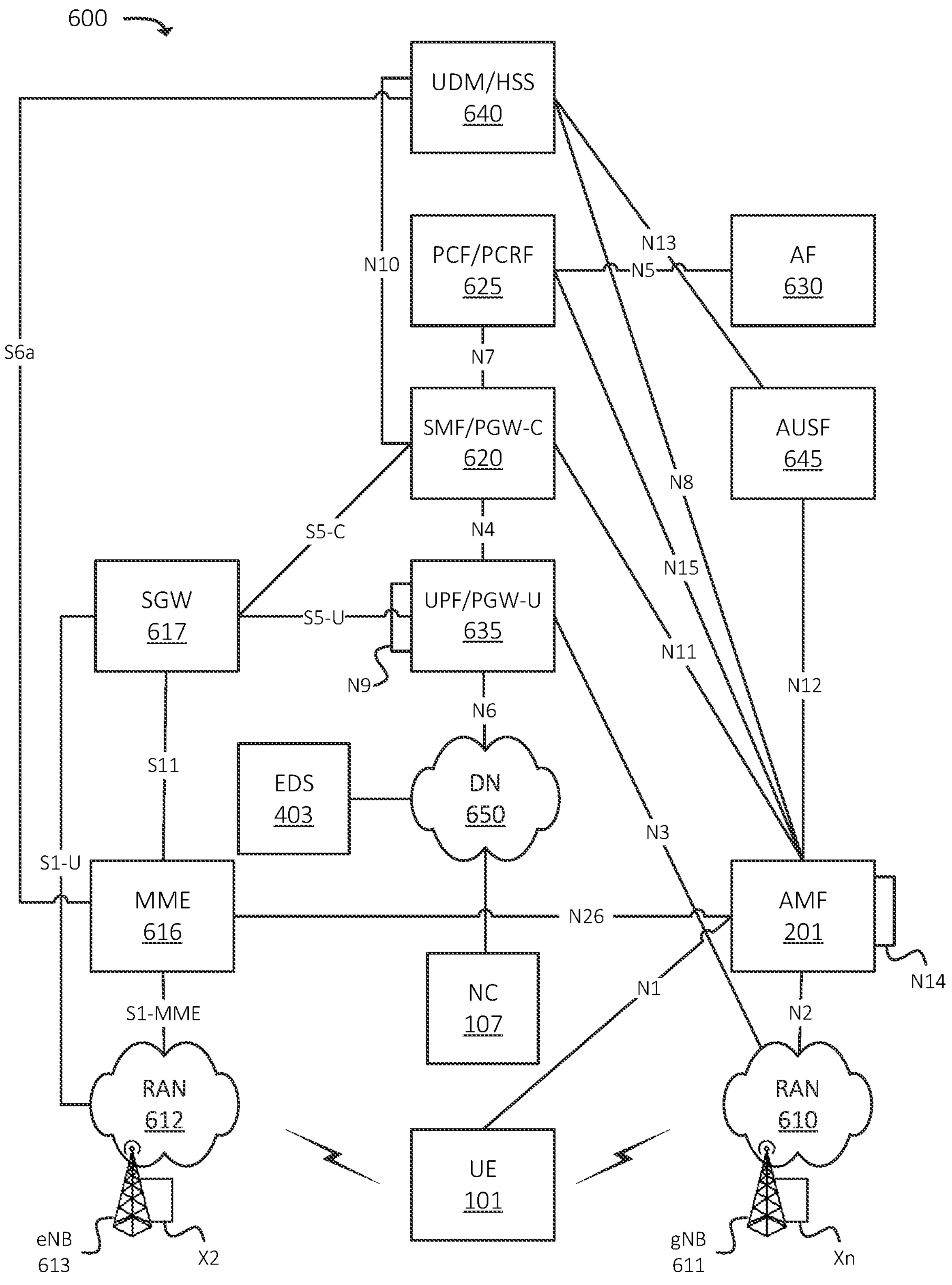
FIGS. 6 and 7 illustrate example environments in which one or more embodiments, described herein, may be implemented.

FIG. 6 illustrates an example environment 600, in which one or more embodiments may be implemented. In some embodiments, environment 600 may correspond to a 5G network, and/or may include elements of a 5G network. In some embodiments, environment 600 may correspond to a 5G Non-Standalone ("NSA") architecture, in which a 5G radio access technology ("RAT") may be used in conjunction with one or more other RATs (e.g., an LTE RAT), and/or in which elements of a 5G core network may be implemented by, may be communicatively coupled with, and/or may include elements of another type of core network (e.g., an evolved packet core ("EPC")). In some embodiments, portions of environment 600 may represent or may include a 5G core ("5GC"). As shown, environment 600 may include UE 101, RAN 610 (which may include one or more Next Generation Node Bs ("gNBs") 611), RAN 612 (which may include one or more evolved Node Bs ("eNBs") 613), and various network functions such as AMF 201, MME 616, SGW 617, SMF/PGW-Control plane function ("PGW-C") 620, PCF/PCRF 625, Application Function ("AF") 630, UPF/PGW-User plane function ("PGW-U") 635, Unified Data Management ("UDM")/Home Subscriber Server ("HSS") 640, and Authentication Server Function ("AUSF") 645. Environment 600 may also include one or more networks, such as Data Network ("DN") 650. Environment 600 may include one or more additional devices or systems communicatively coupled to one or more networks (e.g., DN 650), such as network controller 107, edge discovery system 403, etc.

The example shown in FIG. 6 illustrates one instance of each network component or function (e.g., one instance of SMF/PGW-C 620, PCF/PCRF 625, UPF/PGW-U 635, UDM/HSS 640, and/or AUSF 645). In practice, environment 600 may include multiple instances of such components or functions. For example, in some embodiments, environment 600 may include multiple "slices" of a core network, where each slice includes a discrete and/or logical set of network functions (e.g., one slice may include a first instance of AMF 201, SMF/PGW-C 620, PCF/PCRF 625, and/or UPF/PGW-U 635, while another slice may include a second instance of AMF 201, SMF/PGW-C 620, PCF/PCRF 625, and/or UPF/PGW-U 635). The different slices may provide differentiated levels of service, such as service in accordance with different QoS parameters.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. In some implementations, one or more devices of environment 600 may be physically integrated in, and/or may be physically attached to, one or more other devices of environment 600. Alternatively, or additionally, one or more of the devices of environment 600 may perform one or more network functions described as being performed by another one or more of the devices of environment 600.

Elements of environment 600 may interconnect with each other and/or other devices via wired connections, wireless connections, or a combination of wired and wireless connections. Examples of interfaces or communication pathways between the elements of environment 600, as shown in FIG. 6, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N15 interface, an N26 interface, an S1-MME interface, an S1-U interface, an S5-C interface, an S5-U interface, an S6a interface, an S11 interface, and/or one or more other interfaces. Such interfaces may include interfaces not explicitly shown in FIG. 6, such as Service-Based Interfaces ("SBIs"), including an Namf interface, an Nudm interface, an Npcf interface, an Nupf interface, an Nnef interface, an Nsmf interface, and/or one or more other SBIs. In some embodiments, environment 600 may be, may include, may be implemented by, and/or may be communicatively coupled to wireless network 105.

UE 101 may include a computation and communication device, such as a wireless mobile communication device that is capable of communicating with RAN 610, RAN 612, and/or DN 650. UE 101 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), a Fixed Wireless Access ("FWA") device, or another type of mobile computation and communication device. UE 101 may send traffic to and/or receive traffic (e.g., user plane traffic) from DN 650 via RAN 610, RAN 612, and/or UPF/PGW-U 635.

RAN 610 may be, or may include, a 5G RAN that includes one or more base stations (e.g., one or more gNBs 611), via which UE 101 may communicate with one or more other elements of environment 600. UE 101 may communicate with RAN 610 via an air interface (e.g., as provided by gNB 611). For instance, RAN 610 may receive traffic (e.g., user plane traffic such as voice call traffic, data traffic, messaging traffic, etc.) from UE 101 via the air interface, and may communicate the traffic to UPF/PGW-U 635 and/or one or more other devices or networks. Further, RAN 610 may receive signaling traffic, control plane traffic, etc. from UE 101 via the air interface, and may communicate such signaling traffic, control plane traffic, etc. to AMF 201 and/or one or more other devices or networks. Additionally, RAN 610 may receive traffic intended for UE 101 (e.g., from UPF/PGW-U 635, AMF 201, and/or one or more other devices or networks) and may communicate the traffic to UE 101 via the air interface.

RAN 612 may be, or may include, an LTE RAN that includes one or more base stations (e.g., one or more eNBs 613), via which UE 101 may communicate with one or more other elements of environment 600. UE 101 may communicate with RAN 612 via an air interface (e.g., as provided by eNB 613). For instance, RAN 612 may receive traffic (e.g., user plane traffic such as voice call traffic, data traffic, messaging traffic, signaling traffic, etc.) from UE 101 via the air interface, and may communicate the traffic to UPF/PGW-U 635 (e.g., via SGW 617) and/or one or more other devices or networks. Further, RAN 612 may receive signaling traffic, control plane traffic, etc. from UE 101 via the air interface, and may communicate such signaling traffic, control plane traffic, etc. to MME 616 and/or one or more other devices or networks. Additionally, RAN 612 may receive traffic intended for UE 101 (e.g., from UPF/PGW-U 635, MME 616, SGW 617, and/or one or more other devices or networks) and may communicate the traffic to UE 101 via the air interface.

AMF 201 may include one or more devices, systems, Virtualized Network Functions ("VNFs"), Cloud-Native Network Functions ("CNFs"), etc., that perform operations to register UE 101 with the 5G network, to establish bearer channels associated with a session with UE 101, to hand off UE 101 from the 5G network to another network, to hand off UE 101 from the other network to the 5G network, to manage mobility of UE 101 between RANs 610 and/or gNBs 611, and/or to perform other operations. In some embodiments, the 5G network may include multiple AMFs 201, which communicate with each other via the N14 interface (denoted in FIG. 6 by the line marked "N14" originating and terminating at AMF 201).

MME 616 may include one or more devices, systems, VNFs, CNFs, etc., that perform operations to register UE 101 with the EPC, to establish bearer channels associated with a session with UE 101, to hand off UE 101 from the EPC to another network, to hand off UE 101 from another network to the EPC, to manage mobility of UE 101 between RANs 612 and/or eNBs 613, and/or to perform other operations.

SGW 617 may include one or more devices, systems, VNFs, CNFs, etc., that aggregate traffic received from one or more eNBs 613 and send the aggregated traffic to an external network or device via UPF/PGW-U 635. Additionally, SGW 617 may aggregate traffic received from one or more UPF/PGW-Us 635 and may send the aggregated traffic to one or more eNBs 613. SGW 617 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, CNFs, etc., that gather, process, store, and/or provide information in a manner described herein. SMF/PGW-C 620 may, for example, facilitate the establishment of communication sessions on behalf of UE 101. In some embodiments, the establishment of communication sessions may be performed in accordance with one or more policies provided by PCF/PCRF 625.

PCF/PCRF 625 may include one or more devices, systems, VNFs, CNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625).

AF 630 may include one or more devices, systems, VNFs, CNFs, etc., that receive, store, and/or provide information that may be used in determining parameters (e.g., quality of service parameters, charging parameters, or the like) for certain applications.

UPF/PGW-U 635 may include one or more devices, systems, VNFs, CNFs, etc., that receive, store, and/or provide data (e.g., user plane data). For example, UPF/PGW-U 635 may receive user plane data (e.g., voice call traffic, data traffic, etc.), destined for UE 101, from DN 650, and may forward the user plane data toward UE 101 (e.g., via RAN 610, SMF/PGW-C 620, and/or one or more other devices). In some embodiments, multiple instances of UPF/PGW-U 635 may be deployed (e.g., in different geographical locations), and the delivery of content to UE 101 may be coordinated via the N9 interface (e.g., as denoted in FIG. 6 by the line marked "N9" originating and terminating at UPF/PGW-U 635). Similarly, UPF/PGW-U 635 may receive traffic from UE 101 (e.g., via RAN 610, RAN 612, SMF/PGW-C 620, and/or one or more other devices), and may forward the traffic toward DN 650. In some embodiments, UPF/PGW-U 635 may communicate (e.g., via the N4 interface) with SMF/PGW-C 620, regarding user plane data processed by UPF/PGW-U 635.

UDM/HSS 640 and AUSF 645 may include one or more devices, systems, VNFs, CNFs, etc., that manage, update, and/or store, in one or more memory devices associated with AUSF 645 and/or UDM/HSS 640, profile information associated with a subscriber. AUSF 645 and/or UDM/HSS 640 may perform authentication, authorization, and/or accounting operations associated with one or more UEs 101 and/or one or more communication sessions associated with one or more UEs 101.

DN 650 may include one or more wired and/or wireless networks. For example, DN 650 may include an Internet Protocol ("IP")-based PDN, a wide area network ("WAN") such as the Internet, a private enterprise network, and/or one or more other networks. UE 101 may communicate, through DN 650, with data servers, other UEs 101, and/or to other servers or applications that are coupled to DN 650. DN 650 may be connected to one or more other networks, such as a public switched telephone network ("PSTN"), a public land mobile network ("PLMN"), and/or another network. DN 650 may be connected to one or more devices, such as content providers, applications, web servers, and/or other devices, with which UE 101 may communicate.

Figure 7:
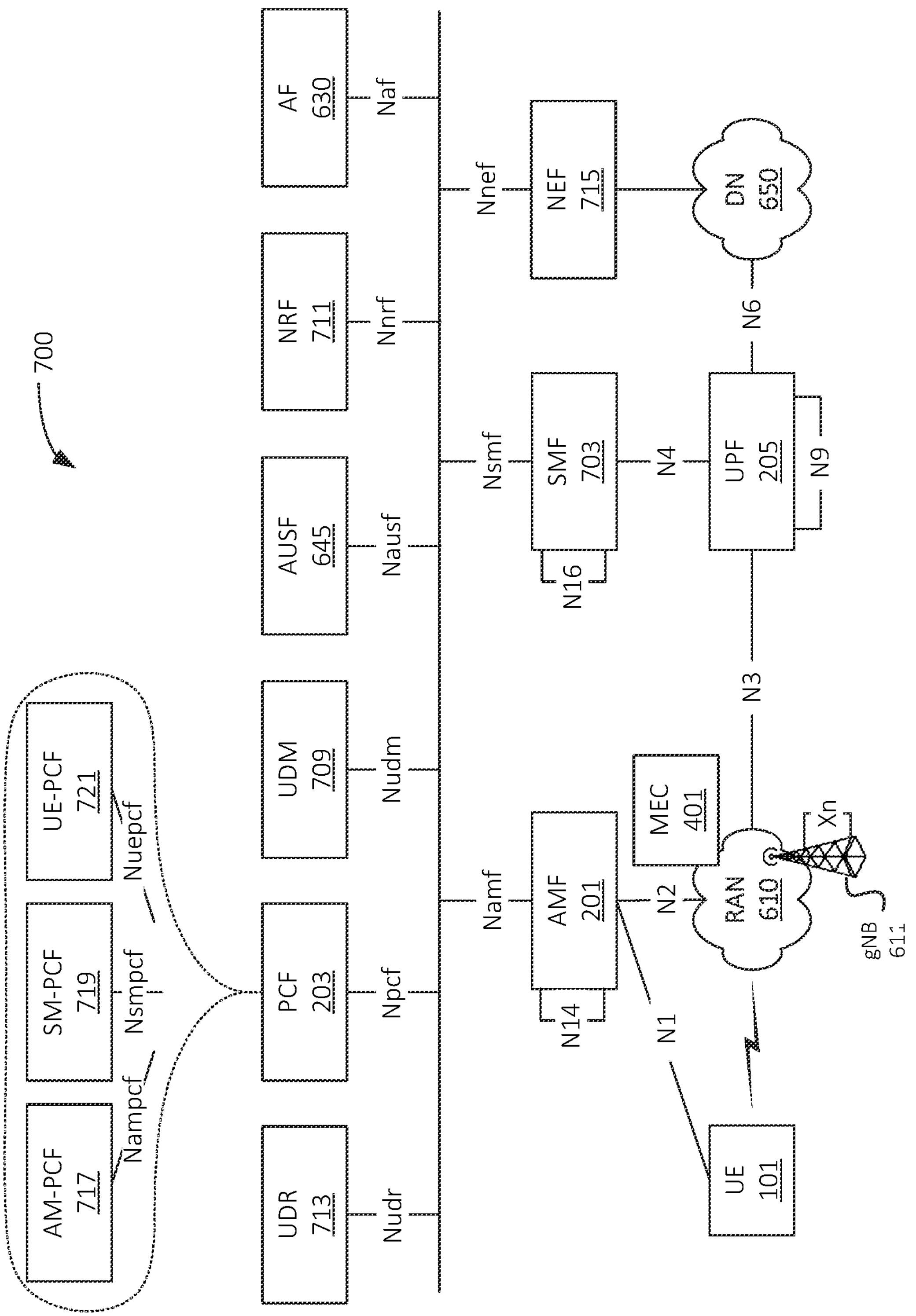

FIG. 7 illustrates another example environment 700, in which one or more embodiments may be implemented. In some embodiments, environment 700 may correspond to a 5G network, and/or may include elements of a 5G network. In some embodiments, environment 700 may correspond to a 5G SA architecture. In some embodiments, environment 700 may include a 5GC, in which 5GC network elements perform one or more operations described herein.

As shown, environment 700 may include UE 101, RAN 610 (which may include one or more gNBs 611 or other types of wireless network infrastructure) and various network functions, which may be implemented as VNFs, CNFs, etc. Such network functions may include AMF 201, SMF 703, UPF 205, PCF 203, UDM 709, AUSF 645, Network Repository Function ("NRF") 711, AF 630, Unified Data Repository ("UDR") 713, and Network Exposure Function ("NEF") 715. Environment 700 may also include or may be communicatively coupled to one or more networks, such as DN 650.

The example shown in FIG. 7 illustrates one instance of each network component or function (e.g., one instance of SMF 703, UPF 205, PCF 203, UDM 709, AUSF 645, etc.). In practice, environment 700 may include multiple instances of such components or functions. For example, in some embodiments, environment 700 may include multiple "slices" of a core network, where each slice includes a discrete and/or logical set of network functions (e.g., one slice may include a first instance of SMF 703, PCF 203, UPF 205, etc., while another slice may include a second instance of SMF 703, PCF 203, UPF 205, etc.). Additionally, or alternatively, one or more of the network functions of environment 700 may implement multiple network slices. The different slices may provide differentiated levels of service, such as service in accordance with different QoS parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. In some implementations, one or more devices of environment 700 may be physically integrated in, and/or may be physically attached to, one or more other devices of environment 700. Alternatively, or additionally, one or more of the devices of environment 700 may perform one or more network functions described as being performed by another one or more of the devices of environment 700.

Elements of environment 700 may interconnect with each other and/or other devices via wired connections, wireless connections, or a combination of wired and wireless connections. Examples of interfaces or communication pathways between the elements of environment 700, as shown in FIG. 7, may include interfaces shown in FIG. 7 and/or one or more interfaces not explicitly shown in FIG. 7. These interfaces may include interfaces between specific network functions, such as an N1 interface, an N2 interface, an N3 interface, an N6 interface, an N9 interface, an N14 interface, an N16 interface, and/or one or more other interfaces. In some embodiments, one or more elements of environment 700 may communicate via a service-based architecture ("SBA"), in which a routing mesh or other suitable routing mechanism may route communications to particular network functions based on interfaces or identifiers associated with such network functions. Such interfaces may include or may be referred to as SBIs, including an Namf interface (e.g., indicating communications to be routed to AMF 201), an Nudm interface (e.g., indicating communications to be routed to UDM 709), an Npcf interface, an Nupf interface, an Nnef interface, an Nsmf interface, an Nnrf interface, an Nudr interface, an Naf interface, and/or one or more other SBIs. In some embodiments, environment 700 may be, may include, may be implemented by, and/or may be communicatively coupled to wireless network 105.

UPF 205 may include one or more devices, systems, VNFs, CNFs, etc., that receive, route, process, and/or forward traffic (e.g., user plane traffic). As discussed above, UPF 205 may communicate with UE 101 via one or more communication sessions, such as PDU sessions. Such PDU sessions may be associated with a particular network slice or other suitable QoS parameters, as noted above. UPF 205 may receive downlink user plane traffic (e.g., voice call traffic, data traffic, etc. destined for UE 101) from DN 650, and may forward the downlink user plane traffic toward UE 101 (e.g., via RAN 610). In some embodiments, multiple UPFs 205 may be deployed (e.g., in different geographical locations), and the delivery of content to UE 101 may be coordinated via the N9 interface.

Similarly, UPF 205 may receive uplink traffic from UE 101 (e.g., via RAN 610), and may forward the traffic toward DN 650. In some embodiments, UPF 205 may implement, may be implemented by, may be communicatively coupled to, and/or may otherwise be associated with UPF/PGW-U 635. In some embodiments, UPF 205 may communicate (e.g., via the N4 interface) with SMF 703, regarding user plane data processed by UPF 205 (e.g., to provide analytics or reporting information, to receive policy and/or authorization information, etc.).

PCF 203 may include one or more devices, systems, VNFs, CNFs, etc., that aggregate, derive, generate, etc. policy information associated with the 5GC and/or UEs 101 that communicate via the 5GC and/or RAN 610. PCF 203 may receive information regarding policies and/or subscriptions from one or more sources, such as subscriber databases (e.g., UDM 709, UDR 713, etc.), and/or from one or more users such as, for example, an administrator associated with PCF 203. In some embodiments, the functionality of PCF 203 may be split into multiple network functions or subsystems, such as access and mobility PCF ("AM-PCF") 717, session management PCF ("SM-PCF") 719, UE PCF ("UE-PCF") 721, and so on. Such different "split" PCFs may be associated with respective SBIs (e.g., AM-PCF 717 may be associated with an Nampcf SBI, SM-PCF 719 may be associated with an Nsmpcf SBI, UE-PCF 721 may be associated with an Nuepcf SBI, and so on) via which other network functions may communicate with the split PCFs. The split PCFs may maintain information regarding policies associated with different devices, systems, and/or network functions.

NRF 711 may include one or more devices, systems, VNFs, CNFs, etc. that maintain routing and/or network topology information associated with the 5GC. For example, NRF 711 may maintain and/or provide IP addresses of one or more network functions, routes associated with one or more network functions, discovery and/or mapping information associated with particular network functions or network function instances (e.g., whereby such discovery and/or mapping information may facilitate the SBA), and/or other suitable information.

UDR 713 may include one or more devices, systems, VNFs, CNFs, etc. that provide user and/or subscriber information, based on which PCF 203 and/or other elements of environment 700 may determine access policies, QoS policies, charging policies, or the like. In some embodiments, UDR 713 may receive such information from UDM 709 and/or one or more other sources.

NEF 715 may include one or more devices, systems, VNFs, CNFs, etc. that provide access to information, application programming interfaces ("APIs"), and/or other operations or mechanisms of the 5GC to devices or systems that are external to the 5GC. NEF 715 may maintain authorization and/or authentication information associated with such external devices or systems, such that NEF 715 is able to provide information, that is authorized to be provided, to the external devices or systems. Such information may be received from other network functions of the 5GC (e.g., as authorized by an administrator or other suitable entity associated with the 5GC), such as SMF 703, UPF 205, a charging function ("CHF") of the 5GC, and/or other suitable network function. NEF 715 may communicate with external devices or systems via DN 650 and/or other suitable communication pathways.

While environment 700 is described in the context of a 5GC, as noted above, environment 700 may, in some embodiments, include or implement one or more other types of core networks. For example, in some embodiments, environment 700 may be or may include a converged packet core, in which one or more elements may perform some or all of the functionality of one or more 5GC network functions and/or one or more EPC network functions. For example, in some embodiments, AMF 201 may include, may implement, may be implemented by, and/or may otherwise be associated with MME 616; SMF 703 may include, may implement, may be implemented by, and/or may otherwise be associated with SGW 617; PCF 203 may include, may implement, may be implemented by, and/or may otherwise be associated with a PCRF; NEF 715 may include, may implement, may be implemented by, and/or may otherwise be associated with a Service Capability Exposure Function ("SCEF"); and so on.

Figure 8:
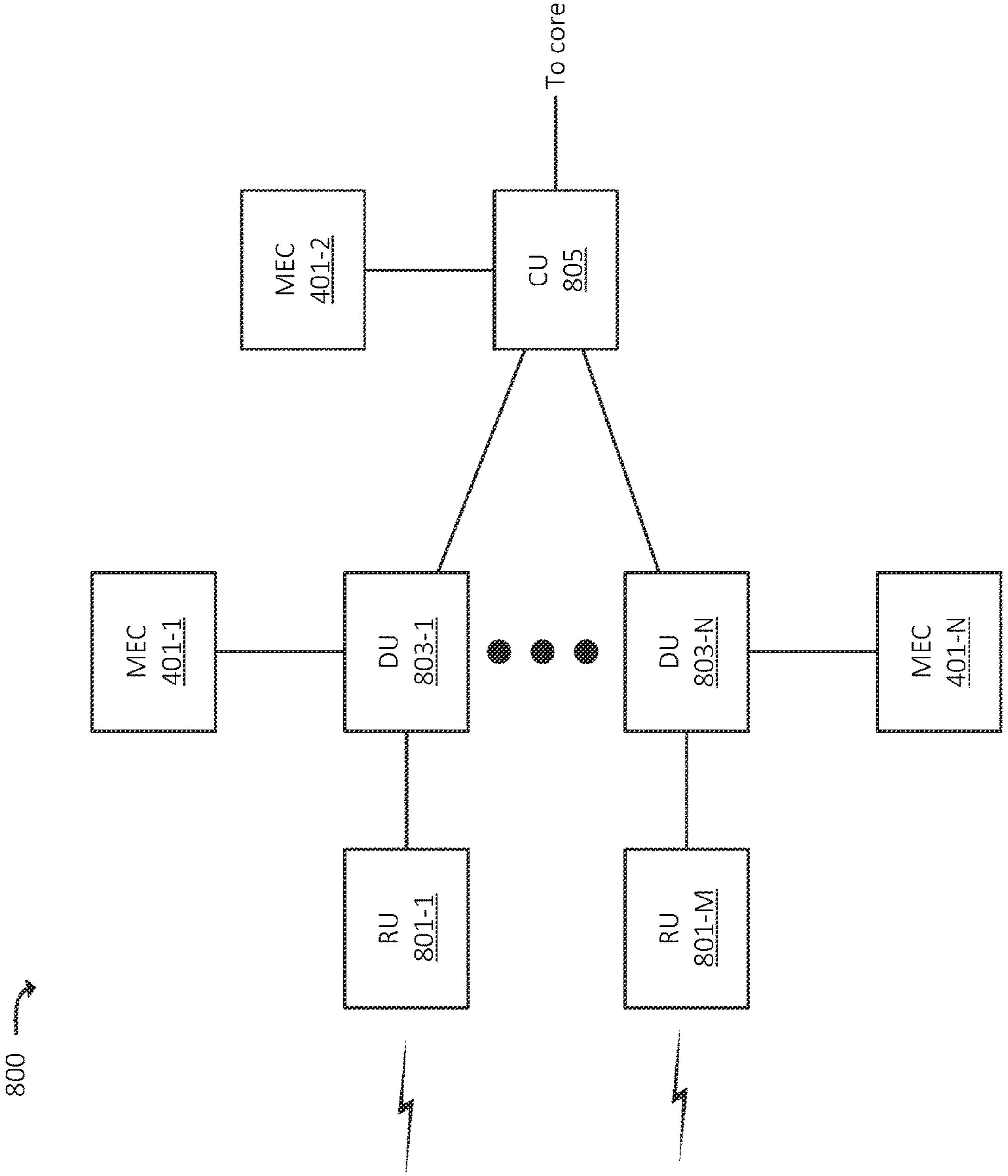
FIG. 8 illustrates an example arrangement of a radio access network ("RAN"), in accordance with some embodiments.

FIG. 8 illustrates an example RAN environment 800, which may be included in and/or implemented by one or more RANs (e.g., RAN 610 or some other RAN). In some embodiments, a particular RAN 610 may include one RAN environment 800. In some embodiments, a particular RAN 610 may include multiple RAN environments 800. In some embodiments, RAN environment 800 may correspond to a particular gNB 611 of RAN 610. In some embodiments, RAN environment 800 may correspond to multiple gNBs 611. In some embodiments, RAN environment 800 may correspond to one or more other types of base stations of one or more other types of RANs. As shown, RAN environment 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 201 and/or UPF 205). In the uplink direction (e.g., for traffic from UEs 101 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 101, and may determine which DU(s) 803 should receive the downlink traffic. DU 803 may include one or more devices that transmit traffic between a core network (e.g., via CU 805) and UE 101 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 101.

RU 801 may include hardware circuitry (e.g., one or more RF transceivers, antennas, radios, and/or other suitable hardware) to communicate wirelessly (e.g., via an RF interface) with one or more UEs 101, one or more other DUs 803 (e.g., via RUs 801 associated with DUs 803), and/or any other suitable type of device. In the uplink direction, RU 801 may receive traffic from UE 101 and/or another DU 803 via the RF interface and may provide the traffic to DU 803. In the downlink direction, RU 801 may receive traffic from DU 803, and may provide the traffic to UE 101 and/or another DU 803.

One or more elements of RAN environment 800 may, in some embodiments, be communicatively coupled to one or more MECs 401. For example, DU 803-1 may be communicatively coupled to MEC 401-1, DU 803-N may be communicatively coupled to MEC 401-N, CU 805 may be communicatively coupled to MEC 401-2, and so on. MECs 401 may include hardware resources (e.g., configurable or provisionable hardware resources) that may be configured to provide services and/or otherwise process traffic to and/or from UE 101, via a respective RU 801.

For example, DU 803-1 may route some traffic, from UE 101, to MEC 401-1 instead of to a core network via CU 805. MEC 401-1 may process the traffic, perform one or more computations based on the received traffic, and may provide traffic to UE 101 via RU 801-1. In some embodiments, MEC 401 may include, and/or may implement, some or all of the functionality described above with respect to UPF 205, AF 630, and/or one or more other devices, systems, VNFs, CNFs, etc. In this manner, ultra-low latency services may be provided to UE 101, as traffic does not need to traverse DU 803, CU 805, links between DU 803 and CU 805, and an intervening backhaul network between RAN environment 800 and the core network.

Figure 9:
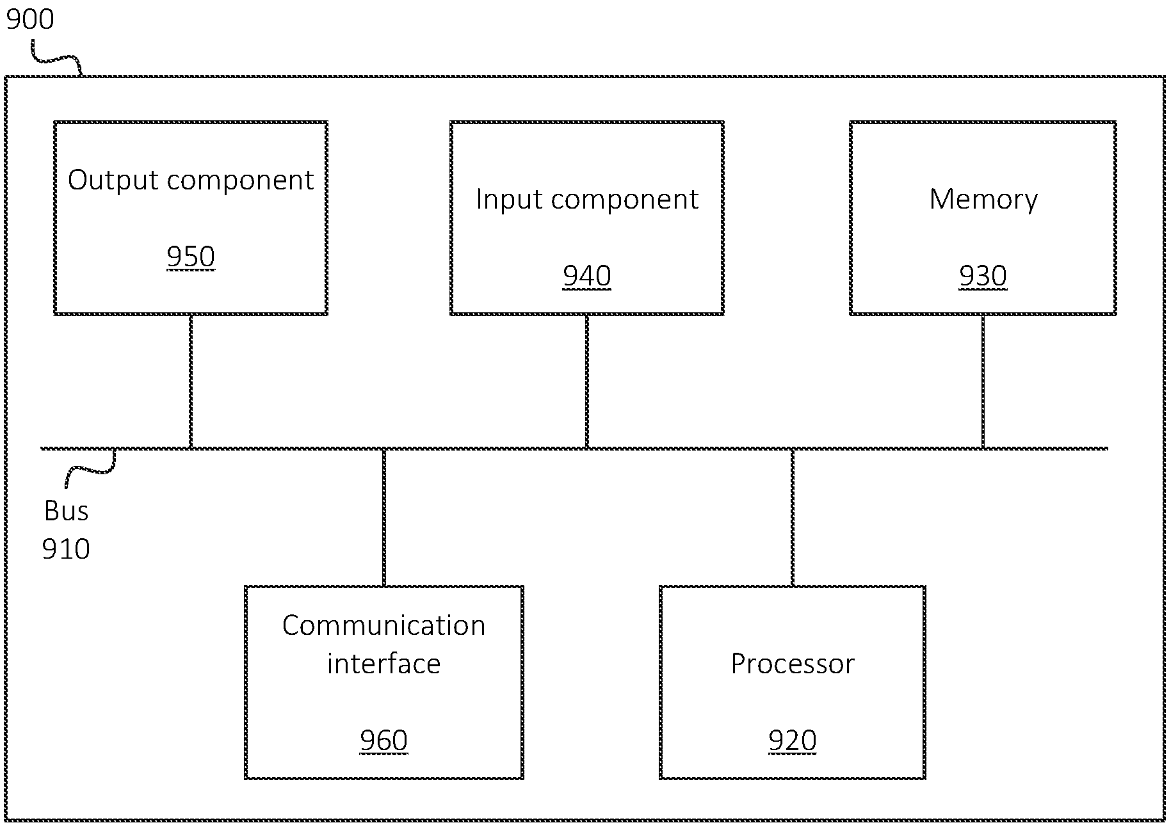
FIG. 9 illustrates example components of one or more devices, in accordance with one or more embodiments described herein.

FIG. 9 illustrates example components of device 900. One or more of the devices described above may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, a set of provisioned hardware resources of a cloud computing system, or other suitable type of hardware that interprets and/or executes instructions (e.g., processor-executable instructions). In some embodiments, processor 920 may be or may include one or more hardware processors. Memory 930 may include any type of dynamic storage device that may store information and instructions for execution by processor 920, and/or any type of non-volatile storage device that may store information for use by processor 920.

Input component 940 may include a mechanism that permits an operator to input information to device 900 and/or otherwise receives or detects input from a source external to input component 940, such as a touchpad, a touchscreen, a keyboard, a keypad, a button, a switch, a microphone or other audio input component, etc. In some embodiments, input component 940 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing instructions, such as software instructions, processor-executable instructions, etc. stored in a computer-readable medium, such as memory 930. A computer-readable medium may be defined as a non-transitory memory device. A memory device may include space within a single physical memory device or spread across multiple physical memory devices. The instructions may be read into memory 930 from another computer-readable medium or from another device. The instructions stored in memory 930 may be processor-executable instructions that cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-5), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:

one or more processors configured to:

maintain a set of Quality of Service ("QoS") parameters associated with a particular User Equipment ("UE") and a particular service type;

provide the set of QOS parameters to a policy element of a wireless network, wherein the wireless network establishes a first dedicated bearer between the particular UE and a first gateway of the wireless network, wherein the first dedicated bearer is associated with the set of QOS parameters;

receive, after the first dedicated bearer is established, information indicating an occurrence of a particular event associated with the particular UE;

identify, based on the information indicating the occurrence of the particular event associated with the particular UE, a second gateway of the wireless network that is associated with the particular UE and the particular service type; and output, to the policy element of the wireless network and based on receiving the information indicating the occurrence of the particular event associated with the particular UE, a request to establish a second dedicated bearer between the particular UE and the second gateway, wherein the request includes the set of QoS parameters, wherein the wireless network establishes the second dedicated bearer with the particular UE based on receiving the request to establish the second dedicated bearer, wherein the second dedicated bearer is associated with the set of QoS parameters.

2. The device of claim 1, wherein the policy element of the wireless network includes at least one of:

a Policy Control Function ("PCF"), or a Policy Charging and Rules Function ("PCRF").

3. The device of claim 1, wherein the one or more processors are further configured to:

subscribe to mobility events associated with the particular UE, wherein the particular event includes a particular mobility event associated with the particular UE.

4. The device of claim 3, wherein the particular mobility event includes a movement of the particular UE from a first geographical region associated with the first gateway of the wireless network to a second geographical region associated with the second gateway of the wireless network.

5. The device of claim 4, wherein the first gateway includes at least one of:

a User Plane Function ("UPF"), or a Packet Data Network ("PDN") gateway ("PGW").

6. The device of claim 3, wherein subscribing to the mobility events associated with the particular UE includes outputting a subscription request to at least one of:

an Access and Mobility Management Function ("AMF") of the wireless network, or a Mobility Management Entity ("MME") of the wireless network.

7. A non-transitory computer-readable medium, storing a plurality of processor-executable instructions to:

maintain a set of Quality of Service ("QoS") parameters associated with a particular User Equipment ("UE") and a particular service type;

provide the set of QOS parameters to a policy element of a wireless network, wherein the wireless network establishes a first dedicated bearer between the particular UE and a first gateway of the wireless network, wherein the first dedicated bearer is associated with the set of QoS parameters;

receive, after the first dedicated bearer is established, information indicating an occurrence of a particular event associated with the particular UE;

identify, based on the information indicating the occurrence of the particular event associated with the particular UE, a second gateway of the wireless network that is associated with the particular UE and the particular service type; and output, to the policy element of the wireless network and based on receiving the information indicating the occurrence of the particular event associated with the particular UE, a request to establish a second dedicated bearer between the particular UE and the second gateway, wherein the request includes the set of QoS parameters, wherein the wireless network establishes the second dedicated bearer with the particular UE based on receiving the request to establish the second dedicated bearer, wherein the second dedicated bearer is associated with the set of QOS parameters.

8. The non-transitory computer-readable medium of claim 7, wherein the policy element of the wireless network includes at least one of:

a Policy Control Function ("PCF"), or a Policy Charging and Rules Function ("PCRF").

9. The non-transitory computer-readable medium of claim 7, wherein the plurality of processor-executable instructions further include processor-executable instructions to:

subscribe to mobility events associated with the particular UE, wherein the particular event includes a particular mobility event associated with the particular UE.

10. The non-transitory computer-readable medium of claim 9, wherein the particular mobility event includes a movement of the particular UE from a first geographical region associated with the first gateway of the wireless network to a second geographical region associated with the second gateway of the wireless network.

11. The non-transitory computer-readable medium of claim 10, wherein the first gateway includes at least one of:

a User Plane Function ("UPF"), or a Packet Data Network ("PDN") gateway ("PGW").

12. The non-transitory computer-readable medium of claim 9, wherein subscribing to the mobility events associated with the particular UE includes outputting a subscription request to at least one of:

an Access and Mobility Management Function ("AMF") of the wireless network, or a Mobility Management Entity ("MME") of the wireless network.

13. A method, comprising:

maintaining a set of Quality of Service ("QoS") parameters associated with a particular User Equipment ("UE") and a particular service type;

providing the set of QOS parameters to a policy element of a wireless network, wherein the wireless network establishes a first dedicated bearer between the particular UE and a first gateway of the wireless network, wherein the first dedicated bearer is associated with the set of QoS parameters;

receiving, after the first dedicated bearer is established, information indicating an occurrence of a particular event associated with the particular UE;

identifying, based on the information indicating the occurrence of the particular event associated with the particular UE, a second gateway of the wireless network that is associated with the particular UE and the particular service type; and outputting, to the policy element of the wireless network and based on receiving the information indicating the occurrence of the particular event associated with the particular UE, a request to establish a second dedicated bearer between the particular UE and the second gateway, wherein the request includes the set of QoS parameters, wherein the wireless network establishes the second dedicated bearer with the particular UE based on receiving the request to establish the second dedicated bearer, wherein the second dedicated bearer is associated with the set of QoS parameters.

14. The method of claim 13, wherein the policy element of the wireless network includes at least one of:

a Policy Control Function ("PCF"), or a Policy Charging and Rules Function ("PCRF").

15. The method of claim 13, further comprising:

subscribing to mobility events associated with the particular UE, wherein the particular event includes a particular mobility event associated with the particular UE.

16. The method of claim 15, wherein the particular mobility event includes a movement of the particular UE from a first geographical region associated with the first gateway of the wireless network to a second geographical region associated with the second gateway of the wireless network, wherein the first gateway includes at least one of:

a User Plane Function ("UPF"), or a Packet Data Network ("PDN") gateway ("PGW").

17. The method of claim 15, wherein subscribing to the mobility events associated with the particular UE includes outputting a subscription request to at least one of:

an Access and Mobility Management Function ("AMF") of the wireless network, or a Mobility Management Entity ("MME") of the wireless network.

18. The method of claim 13, further comprising:

receiving the set of QoS parameters, via at least one of a Network Exposure Function ("NEF") or a Service Capability Exposure Function ("SCEF") of the wireless network, from a system associated with the particular service type.

19. The device of claim 1, wherein the one or more processors are further configured to:

receive the set of QoS parameters, via at least one of a Network Exposure Function ("NEF") or a Service Capability Exposure Function ("SCEF") of the wireless network, from a system associated with the particular service type.

20. The non-transitory computer-readable medium of claim 7, wherein the plurality of processor-executable instructions further include processor-executable instructions to:

receive the set of QoS parameters, via at least one of a Network Exposure Function ("NEF") or a Service Capability Exposure Function ("SCEF") of the wireless network, from a system associated with the particular service type.

* * * * *